(12) United States Patent
Swarup et al.

(10) Patent No.: US 9,688,873 B2
(45) Date of Patent: Jun. 27, 2017

(54) CURABLE FILM-FORMING COMPOSITIONS AND METHOD OF MITIGATING DIRT BUILD-UP ON A SUBSTRATE

(71) Applicant: PPG INDUSTRIES OHIO, INC., Cleveland, OH (US)

(72) Inventors: Shanti Swarup, Allison Park, PA (US); W David Polk, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 368 days.

(21) Appl. No.: 14/326,820

(22) Filed: Jul. 9, 2014

(65) Prior Publication Data
US 2016/0009940 A1    Jan. 14, 2016

(51) Int. Cl.
| | | |
|---|---|---|
| *C09D 133/10* | (2006.01) | |
| *B05D 5/00* | (2006.01) | |
| *B05D 3/10* | (2006.01) | |
| *C08F 220/06* | (2006.01) | |
| *C09D 4/06* | (2006.01) | |
| *C08F 220/32* | (2006.01) | |
| *C08F 230/08* | (2006.01) | |
| *C09D 133/14* | (2006.01) | |
| *C08L 33/14* | (2006.01) | |
| *C09D 133/06* | (2006.01) | |

(52) U.S. Cl.
CPC ........... *C09D 133/10* (2013.01); *B05D 3/108* (2013.01); *B05D 5/00* (2013.01); *C08F 220/06* (2013.01); *C08F 220/32* (2013.01); *C08F 230/08* (2013.01); *C08L 33/14* (2013.01); *C09D 4/06* (2013.01); *C09D 133/068* (2013.01); *C09D 133/14* (2013.01)

(58) Field of Classification Search
CPC .... C09D 133/10; C09D 4/06; C09D 133/068; C09D 133/14; B05D 3/108; B05D 5/00; C08F 220/06; C08F 220/32; C08F 230/08; C08L 33/14

USPC .......................................................... 428/413
See application file for complete search history.

(56) References Cited

U.S. PATENT DOCUMENTS

| | | | |
|---|---|---|---|
| 7,122,599 B2 | 10/2006 | Haubennestel et al. | |
| 2004/0220306 A1 | 11/2004 | Kageishi et al. | |
| 2006/0039889 A1* | 2/2006 | Lafaysse | C08G 59/306 424/78.09 |
| 2010/0069551 A1 | 3/2010 | Minge et al. | |
| 2013/0142957 A1 | 6/2013 | Connelly et al. | |
| 2013/0236649 A1 | 9/2013 | Mowrer | |
| 2013/0310464 A1 | 11/2013 | Jaunky et al. | |

FOREIGN PATENT DOCUMENTS

EP              066290 A1      8/1995

OTHER PUBLICATIONS

Carneiro et al., "Nanocomposite Acrylic Paint with Self-cleaning Action", J. Coat. Technol., 2012 pp. 687-693, Res. 9 (6).

* cited by examiner

*Primary Examiner* — Ling Choi
*Assistant Examiner* — Chun-Cheng Wang
(74) *Attorney, Agent, or Firm* — Krisanne Shideler

(57) ABSTRACT

The present invention is directed to curable film-forming compositions comprising acrylic polymers, and to coated substrates comprising the curable film-forming composition applied to at least one surface of the substrates. The acrylic polymers comprise epoxy functional groups and polydialkylsiloxane functional groups. The present invention is also drawn to methods of mitigating dirt build-up on a substrate, comprising applying to at least a portion of the substrate the curable film-forming composition described above and at least partially curing the curable film-forming composition.

15 Claims, No Drawings

US 9,688,873 B2

CURABLE FILM-FORMING COMPOSITIONS AND METHOD OF MITIGATING DIRT BUILD-UP ON A SUBSTRATE

FIELD OF THE INVENTION

The present invention relates to curable film-forming compositions and methods of mitigating dirt build-up on substrates.

BACKGROUND OF THE INVENTION

Easy cleaning of coated surfaces is a significant selling point for many industries, in both consumer and industrial markets. Easy removal of dirt and prevention of dirt build-up are desirable properties for products such as automobiles. Environmental contaminants such as tar, asphalt, animal droppings, road salt, detergents, and the like may damage the surface of coated vehicles, architectural surfaces, and other industrial substrates. Damage may be caused by a chemical reaction of the contaminant with the coated surface such as by chemical etching, or may involve physical removal of part or all of the coating from the substrate (i.e., "cohesive failure") upon removal of the contaminant during cleaning. Cohesive failure may also involve incomplete removal of the contaminant from the coated surface during cleaning.

It would be desirable to provide coating compositions that may be used in methods of mitigating dirt build-up on a substrate in order to prevent such damage to coatings.

SUMMARY OF THE INVENTION

The present invention is directed to curable film-forming compositions comprising (a) a film-forming polymer comprising reactive epoxy functional groups; (b) a curing agent comprising acid functional groups reactive with the reactive functional groups in (a); and (c) an acrylic polymer component comprising: (i) epoxy functional groups; and (ii) polydialkylsiloxane functional groups. The components (a), (b), and (c) are different from one another. The present invention is further directed to coated substrates comprising the curable film-forming composition applied to at least one surface of the substrates.

The present invention is also drawn to methods of mitigating dirt buildup on a substrate, comprising applying to at least a portion of the substrate the curable film-forming composition described above, and at least partially curing the composition.

DETAILED DESCRIPTION OF THE INVENTION

Other than in any operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used in this specification and the appended claims, the articles "a," "an," and "the" include plural referents unless expressly and unequivocally limited to one referent.

The various embodiments and examples of the present invention as presented herein are each understood to be non-limiting with respect to the scope of the invention.

As used in the following description and claims, the following terms have the meanings indicated below:

The term "curable", as used for example in connection with a curable composition, means that the indicated composition is polymerizable or cross linkable through functional groups, e.g., by means that include, but are not limited to, thermal (including ambient cure) and/or catalytic exposure.

The term "cure", "cured" or similar terms, as used in connection with a cured or curable composition, e.g., a "cured composition" of some specific description, means that at least a portion of the polymerizable and/or crosslinkable components that form the curable composition is polymerized and/or crosslinked. Additionally, curing of a polymerizable composition refers to subjecting said composition to curing conditions such as but not limited to thermal curing, leading to the reaction of the reactive functional groups of the composition, and resulting in polymerization and formation of a polymerizate. When a polymerizable composition is subjected to curing conditions, following polymerization and after reaction of most of the reactive end groups occurs, the rate of reaction of the remaining unreacted reactive end groups becomes progressively slower. The polymerizable composition can be subjected to curing conditions until it is at least partially cured. The term "at least partially cured" means subjecting the polymerizable composition to curing conditions, wherein reaction of at least a portion of the reactive groups of the composition occurs, to form a polymerizate. The polymerizable composition can also be subjected to curing conditions such that a substantially complete cure is attained and wherein further curing results in no significant further improvement in polymer properties, such as hardness.

The term "reactive" refers to a functional group capable of undergoing a chemical reaction with itself and/or other functional groups spontaneously or upon the application of heat or in the presence of a catalyst or by any other means known to those skilled in the art.

By "polymer" is meant a polymer including homopolymers and copolymers, and oligomers. By "composite material" is meant a combination of two or more different materials.

The term "(meth)acrylate" is meant to encompass acrylate and/or methacrylate molecular structures where they exist.

The curable film-forming compositions of the present invention comprise (a) a film-forming polymer comprising reactive epoxy functional groups; (b) a curing agent comprising acid functional groups reactive with the reactive functional groups in (a); and (c) an acrylic polymer component comprising: (i) epoxy functional groups; and (ii) polydialkylsiloxane functional groups.

The film-forming polymer (a) comprising reactive epoxy functional groups may comprise an acrylic polymer. Suitable acrylic polymers include copolymers of one or more alkyl esters of acrylic acid or methacrylic acid, often together with one or more other polymerizable ethylenically unsaturated monomers. Useful alkyl esters of acrylic acid or methacrylic acid include aliphatic alkyl esters containing from 1 to 30, and usually 4 to 18 carbon atoms in the alkyl group. Non-limiting examples include methyl methacrylate, ethyl methacrylate, butyl methacrylate, ethyl acrylate, butyl acrylate, and 2-ethyl hexyl acrylate. Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate.

The acrylic copolymer can include hydroxyl functional groups, which are often incorporated into the polymer by including one or more hydroxyl functional monomers in the reactants used to produce the copolymer. Useful hydroxyl functional monomers include hydroxyalkyl acrylates and methacrylates, typically having 2 to 4 carbon atoms in the hydroxyalkyl group, such as hydroxyethyl acrylate, hydroxypropyl acrylate, 4-hydroxybutyl acrylate, hydroxy functional adducts of caprolactone and hydroxyalkyl acrylates, and corresponding methacrylates, as well as the beta-hydroxy ester functional monomers. The acrylic polymer can also be prepared with N-(alkoxymethyl)acrylamides and N-(alkoxymethyl)methacrylamides.

Useful ethylenically unsaturated, epoxy functional monomers used to prepare the film-forming polymer (a) include, but are not limited to, glycidyl acrylate, glycidyl methacrylate, allyl glycidyl ether, methallyl glycidyl ether, 1:1 (molar) adducts of ethylenically unsaturated monoisocyanates with hydroxy functional monoepoxides such as glycidol, and glycidyl esters of polymerizable polycarboxylic acids such as maleic acid. Glycidyl acrylate and glycidyl methacrylate are used most often. The epoxy group-containing ethylenically unsaturated monomer is preferably used in amounts of from about 20 to 90, more preferably from 30 to 70 percent by weight of the total monomers used in preparing the epoxy-containing acrylic film-forming polymer (a).

Generally any method of producing such polymers that is known to those skilled in the art utilizing art recognized amounts of monomers can be used.

The film-forming polymer (a) comprising reactive epoxy functional groups may alternatively comprise polyglycidyl ethers of cyclic polyols. These polyepoxides can be prepared by etherification of polyhydric phenols with an epihalohydrin or dihalohydrin such as epichlorohydrin or dichlorohydrin in the presence of alkali. Nonlimiting examples of suitable polyhydric phenols include 2,2-bis-(4-hydroxyphenyl)propane (Bisphenol A), 1,1-bis-(4-hydroxyphenl)ethane,2-methyl-1,1-bis-(4-hydroxyphenyl)propane, 2,2-(4-hydroxy-3-tertiarybutylphenyl)propane, and bis-(2-hydroxynaphthyl)methane.

Besides polyhydric phenols, other cyclic polyols can be used to prepare the polyglycidyl ethers. Examples of such cyclic polyols include alicyclic polyols, such as cycloaliphatic polyols, for example 1,2-cyclohexanediol, 1,4-cyclohexanediol, 1,2-bis-(hydroxymethyl)cyclohexane, 1,3-bis-(hydroxymethyl)cyclohexane and hydrogenated Bisphenol A.

The polyepoxides can be chain-extended with a polyhydroxyl group-containing material. Examples include a low molecular weight (simple) polyol such as neopentyl glycol, or a polymeric polyol such as a polyether polyol or a polyester polyol. A chain extended polyepoxide is typically prepared as follows: the polyepoxide and polyhydroxyl group-containing material are reacted together neat or in the presence of an inert organic solvent such as a ketone, including methyl isobutyl ketone and methyl amyl ketone, aromatics such as toluene and xylene, and glycol ethers such as the dimethyl ether of diethylene glycol. The reaction is typically conducted at a temperature of about 80° C. to 160° C. for about 30 to 180 minutes until an epoxy group-containing resinous reaction product is obtained.

Polyether polyols suitable for chain-extending the polyepoxide may be formed by reacting a cyclic polyol such as those listed above with ethylene oxide or optionally with a mixture of ethylene oxide and an alkylene oxide having 3 to 4 carbon atoms in the alkylene chain. 1-2-propylene oxide, 1-methyl-1,2-propylene oxide, 1,2-butylene oxide, butadiene monoepoxide, epichlorohydrin, glycidol, cyclohexane oxide and styrene oxide are all suitable alkylene oxides.

Polyester polyols for chain extension can be prepared by polyesterification of organic polycarboxylic acids or anhydrides thereof with organic polyols containing primary hydroxyls. Usually the polycarboxylic acids and polyols are aliphatic or aromatic dibasic acids and dials.

The diols which are usually employed in making the polyester include alkylene glycol, such as ethylene glycol and butylene glycol, neopentyl glycol and other glycols such as cyclohexanedimethanol.

The acid component of the polyester may be monomeric carboxylic acids or anhydrides having 2 to 18 carbon atoms per molecule. Among the acids which are useful are phthalic acid, isophthalic acid, terephthalic acid, tetrahydrophthalic acid, hexahydrophthalic acid, adipic acid, azelaic acid, sebacic acid, maleic acid, glutaric acid, chlorendic acid, tetrachlorophthalic acid and the like. Where acids are referred to above, it is understood that the anhydrides of those acids which form anhydrides can be used in place of the acid.

Besides polyester polyols formed from polybasic acids of polyols, lactone polyesters can also be employed. These products are formed from the reaction of a lactone such as epsilon-caprolactone with a polyol.

Other suitable polyepoxides useful as the film-forming polymer (a) can be produced similarly from Novolac resins or similar polyphenols, The film-forming polymer (a) comprising reactive epoxy functional groups may alternatively comprise a polyester or polyurethane. Polyester polymers may be prepared in a known manner by condensation of polyhydric alcohols and polycarboxylic acids. Suitable polyhydric alcohols include, but are not limited to, ethylene glycol, propylene glycol, butylene glycol, 1,6-hexylene glycol, neopentyl glycol, diethylene glycol, glycerol, trimethylol propane, and pentaerythritol. Suitable polycarboxylic acids include, but are not limited to, succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the acids such as anhydrides where they exist or lower alkyl esters of the acids such as the methyl esters may be used.

Polyurethanes can also be used as the film-forming polymer (a) in the film-forming composition of the present invention. Among the polyurethanes which can be used are polymeric polyols which generally are prepared by reacting polyester polyols or acrylic polyols with a polyisocyanate such that the OH/NCO equivalent ratio is greater than 1:1 so that free hydroxyl groups are present in the product. The organic polyisocyanate which is used to prepare the polyurethane polyol can be an aliphatic or an aromatic polyisocyanate or a mixture of the two. Diisocyanates are preferred, although higher polyisocyanates can be used in place of or in combination with diisocyanates. Examples of suitable aromatic diisocyanates are 4,4'-diphenylmethane diisocyanate and toluene diisocyanate. Examples of suitable aliphatic diisocyanates are straight chain aliphatic diisocyanates such as 1,6-hexamethylene diisocyanate. Also, cycloaliphatic diisocyanates can be employed. Examples include isophorone diisocyanate and 4,4'-methylene-bis-(cyclohexyl isocyanate). Examples of suitable higher polyisocyanates are 1,2,4-benzene triisocyanate and polymethylene polyphenyl isocyanate. As with the polyesters, the polyurethanes can be prepared with unreacted carboxylic acid groups, which upon neutralization with bases such as amines allows for dispersion into aqueous medium.

Epoxide functional groups may be incorporated into the polyurethane or polyester by methods well known in the art. For example, epoxide groups can be incorporated by reacting hydroxyl groups on the polyurethane or polyester with an epihalohydrin or dihalohydrin such as epichlorohydrin or dichlorohydrin in the presence of alkali.

The film-forming polymer (a) comprising reactive epoxy functional groups is typically present in the curable film-forming composition in an amount of 10 to 90, usually 25 to 75 percent by weight, such as 30 to 65 percent by weight, often 45 to 60 percent by weight, based on the total weight of resin solids in the curable film-forming composition.

The curable film-forming composition of the present invention further comprises (b) a curing (crosslinking) agent comprising acid functional groups, such as polycarboxylic acids. The acid functional groups are reactive with the epoxy functional groups in (a).

Examples of suitable polycarboxylic acids include adipic, succinic, sebacic, azelaic, and dodecanedioic acid. Other suitable polyacid crosslinking agents include acid group-containing polymers as described below.

The curing agent (b) may comprise an addition polymer, polyester polymer, polyurethane polymer, polyether polymer, polyester acrylate, and/or polyurethane acrylate. Often an acrylic polymer and/or polyester polymer having multiple acid functional groups is used.

In particular embodiments, the polyacid curing agent is a carboxyl-terminated material having at least two carboxyl groups per molecule. Among the polyacid curing agents which may be used include carboxylic acid group-containing polymers such as acrylic polymers, polyesters, and polyurethanes; oligomers such as ester group-containing oligomers and monomers. Usually, the polyacid curing agent has a $T_g$ less than 30° C. Such low $T_g$ materials enable the formation of high solids liquid compositions. Higher $T_g$ materials require the use of more solvent.

When the polyacid curing agent is an acrylic polymer, copolymers of (i) an ethylenically unsaturated monomer containing at least one carboxylic acid and (ii) a different ethylenically unsaturated monomer which is free from carboxylic acid groups can be used. To be suitable herein, the acrylic polymer usually has an acid number of 30 to 150, often 60 to 120.

Examples of epoxy-reactive monomers (i) are acrylic acid, methacrylic acid, maleic acid and partial esters of maleic acid. The other monomeric component (ii) may be styrene, alpha-substituted lower alkyl styrenes such as alpha-methylstyrene, alkyl esters of acrylic and methacrylic acids, especially the lower alkyl esters thereof, e.g. methyl methacrylate, methyl and ethyl acrylate, and mixtures of these materials. The relative amounts of monomers (i) and (ii) in the copolymer may be varied but, in any event, the copolymer must comprise sufficient amounts of monomers (i) and (ii) to give an acid number within the limits indicated heretofore.

The acrylic copolymer may be prepared in conventional fashion, e.g. by heating monomers (i) and (ii) at elevated temperatures, usually on the order of 90 to 140° C., often 115° C. to 125° C. This polymerization may be carried out in bulk or in solution using such conventional solvents as aromatic hydrocarbons, typically benzene, toluene and xylene, or alcohols (e.g. butyl alcohol or monoalkyl ethers of ethylene glycol) and the like.

The polymerization is usually carried out in the presence of a polymerization catalyst, typically, peroxides such as benzoyl peroxide, di-tertiarybutyl-peroxide, di-cumene peroxide and methyl-ethyl ketone peroxide, or other catalysts of the free-radical type.

Most often, the carboxylic acid group-containing acrylic polymer will have a relatively low molecular weight. These products are non-gelled and typically will have number average molecular weights as determined by gel permeation chromatography using a polystyrene standard of from about 500 to 5000, preferably 700 to 3000. The preferred reaction products will also have a uniform molecular weight distribution which is evidenced by polydispersity values which are preferably less than 4, more preferably from 2 to 3. The polydispersity value is the ratio of the weight average molecular weight to the number average molecular weight each being determined by gel permeation chromatography using a polystyrene standard as described above.

Besides acid group-containing acrylic polymers, acid group-containing polyesters can be used as the curing agent (b). Such polyesters may be formed by reacting a polyol with excess polycarboxylic acid or anhydride.

With regard to the polyol-polycarboxylic acid or polycarboxylic acid anhydride, various polyols can be used including ethylene glycol, neopentyl glycol, glycerol, pentaerythritol, trimethylolpropane, and the like. Also, acid group-containing polyols such as dimethylolpropionic acid can be used.

Various polycarboxylic acids may be employed including dicarboxylic acids such as phthalic acid, tetrahydrophthalic acid, hexahydrophthalic acid, maleic acid, itaconic acid, adipic acid, sebacic acid, and the like. Also anhydrides of the polycarboxylic acids where they exist can be used.

The preparation of acid group-containing polyesters is well known in the art and usually involves preparation in organic solvent with sufficient acid group-containing ingredients to form an acid group-containing material at the completion of the reaction. A sufficient excess of the acid component is employed in forming the polymers to provide an acid value of from 10 to 120 with a preferred acid value being from 30 to 60.

Besides acid group-containing polyesters, ester group-containing oligomers can be used. Examples include half-esters formed from reacting polyols and 1,2-acid anhydrides. The half-esters are particularly suitable because they are of relatively low molecular weight and are quite reactive with epoxy functionality enabling the formulation of high solids fluid compositions while maintaining outstanding properties such as gloss and distinctness of image.

The half-ester is obtained by reaction between a polyol and a 1,2-acid anhydride under conditions sufficient to ring open the anhydride forming the half-ester with substantially no polyesterification occurring. Such reaction products are of relatively low molecular weight with narrow molecular weight distributions and provide lower volatile organic contents in the coating composition while still providing for excellent properties in the resultant coating. By substantially no polyesterification occurring means that the carboxyl groups of the anhydride are not esterified by the polyol in a recurring manner. By this is meant that less than 10, preferably less than 5 percent by weight polyester is formed.

The 1,2-acid anhydride and polyol are contacted together usually by mixing the two ingredients together in a reaction vessel. Preferably, reaction is conducted in the presence of an inert atmosphere such as nitrogen and in the presence of a solvent to dissolve the solid ingredients and/or to lower the viscosity of the reaction mixture. Examples of suitable solvents are high boiling materials and include, for example, ketones such as methyl amyl ketone, diisobutyl ketone, methyl isobutyl ketone; aromatic hydrocarbons such as toluene and xylene; as well as other organic solvents such as dimethyl formamide and N-methyl-pyrrolidone.

For the desired ring opening reaction and half-ester formation, a 1,2-dicarboxylic anhydride is used. Reaction of a polyol with a carboxylic acid instead of an anhydride would require esterification by condensation eliminating water which would have to be removed by distillation. Under these conditions this would promote undesired polyesterification. Also, the reaction temperature is preferably low, that is, no greater than 135° C., preferably less than 120° C., and usually within the range of 70-135° C., preferably 90°-120° C. Temperatures greater than 135° C. are undesirable because they promote polyesterification, whereas temperatures less than 70° C. are undesirable because of sluggish reaction.

The time of reaction can vary somewhat depending principally upon the temperature of reaction. Usually the reaction time will be from as low as 10 minutes to as high as 24 hours.

The equivalent ratio of anhydride to hydroxy on the polyol is preferably at least about 0.8:1 (the anhydride being considered monofunctional) to obtain maximum conversion to the desired half-ester. Ratios less than 0.8:1 can be used but such ratios result in increased formation of less preferred half-esters.

Among the anhydrides which can be used in the formation of the desired polyesters are those which exclusive of the carbon atoms and the anhydride moiety contain from about 2 to 30 carbon atoms. Examples include aliphatic, including cycloaliphatic, olefinic and cycloolefinic anhydrides and aromatic anhydrides. Substituted aliphatic and aromatic anhydrides are also included within the definition of aliphatic and aromatic provided the substituents do not adversely affect the reactivity of the anhydride or the properties of the resultant polyester. Examples of substituents would be chloro, alkyl and alkoxy. Examples of anhydrides include succinic anhydride, methylsuccinic anhydride, dodecenyl succinic anhydride, octadecenylsuccinic anhydride, phthalic anhydride, tetrahydrophthalic anhydride, methyltetrahydrophthalic anhydride, hexahydrophthalic anhydride, alkyl hexahydrophthalic anhydrides such as methylhexahydrophthalic anhydride, tetrachlorophthalic anhydride, endomethylene tetrahydrophthalic anhydride, chlorendic anhydride, itaconic anhydride, citraconic anhydride and maleic anhydride.

Among the polyols which can be used are those which contain from about 2 to 20 carbon atoms. Preferred are diols, triols and mixtures thereof. Examples include polyols containing from 2 to 10 carbon atoms. Examples include aliphatic polyols such as ethylene glycol, 1,2-propanediol, 1,3-propanediol, 1,4-butanediol, 1,5-pentanediol, glycerol, 1,2,3-butanetriol, 1,6-hexanedial, neopentyl glycol, diethylene glycol, dipropylene glycol, 1,4-cyclohexanedimethanol, trimethylolpropane, 2,2,4-trimethylpentane-1,3-diol, pentaerythritol a tetrol. Aromatic polyols such as bisphenol A and bis(hydroxymethyl)xylene can also be used.

In addition to the acid group-containing polymers and oligomers mentioned above, monomers containing at least two acid groups can be used. Examples of suitable monomeric polycarboxylic acids are those containing from 5 to 20 carbon atoms and include open chain, cyclic, saturated, unsaturated and aromatic acids. Examples include succinic acid, adipic acid, azelaic acid, sebacic acid, hexahydrophthalic acid, maleic acid, cyclohexene-1,2-dicarboxylic acid and phthalic acid.

The curing agent (b) is present in the curable film-forming composition in amounts of about 10 to 90, such as 30 to 65 percent by weight, often 45 to 60 percent by weight, based on total weight of resin solids in the curable film forming composition.

The curable film-forming composition used in the method of the present invention further comprises (c) an acrylic polymer component comprising (i) epoxy functional groups; and (ii) polydialkylsiloxane functional groups.

The reaction mixture that may be used to prepare the acrylic polymer (c) comprises (i) an ethylenically unsaturated monomer comprising epoxy functional groups. Examples include glycidyl acrylate, glycidyl methacrylate, allyl glycidyl ether, methallyl glycidyl ether, 1:1 (molar) adducts of ethylenically unsaturated monoisocyanates with hydroxy functional monoepoxides such as glycidol, and glycidyl esters of polymerizable polycarboxylic acids such as maleic acid. Glycidyl acrylate and glycidyl methacrylate are used most often.

The reaction mixture that may be used to prepare the acrylic polymer (c) further comprises (ii) an ethylenically unsaturated monomer comprising polydialkylsiloxane, usually polydimethylsiloxane, functional groups. Such monomers may be prepared, for example, by reacting a polydialkylsiloxane having hydroxyl end groups with an ethylenically unsaturated monomer that has functional groups reactive with hydroxyl groups, such as acid or epoxy functional groups.

Examples of suitable ethylenically unsaturated monomer comprising polydialkylsiloxane functional groups include SILMER Mo8 (available from Siltech Corporation), X-22-2426 (available from Shin-Etsu Chemical Co), MCR-M07, MCR-M11, MCR-M17, MCR-M22, MCS-M11, MFR-M15 and MFS-M15 (available from Gelest, Inc), FM-0711, FM-0721 and FM-0725 (available from JNC Corporation).

The ethylenically unsaturated monomer (ii) comprising polydialkylsiloxane functional groups typically has a weight average molecular weight of 1,000 to 30,000, often 1500 to 15,000, measured by GPC using polystyrene calibration standards, 2 PL gel MIXED-C as the column, THF as eluent at 1 ml/min and refractive index detector. The polydialkylsiloxane group is typically at least oligomeric, such that the resulting ethylenically unsaturated monomer is often a macromonomer.

The ethylenically unsaturated monomer (ii) comprising polydialkylsiloxane functional groups is typically present in the reaction mixture that can be used to prepare the acrylic polymer in an amount of 1 to 50, more often 10 to 30 percent by weight, based on the total weight of monomers in the reaction mixture.

One or more other polymerizable ethylenically unsaturated monomers may be included in the reaction mixture used to prepare the acrylic polymer (c). Useful alkyl esters of acrylic acid or methacrylic acid include aliphatic alkyl esters containing from 1 to 30, and preferably 4 to 18 carbon atoms in the alkyl group. Non-limiting examples include methyl(meth)acrylate, ethyl(meth)acrylate, butyl (meth) acrylate, and 2-ethyl hexyl acrylate. Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate. Styrene is most often used.

When used, these additional ethylenically unsaturated monomers are typically present in the reaction mixture used to prepare the acrylic polymer in an amount of 5 to 50, more often 10 to 30 percent by weight, based on the total weight of monomers in the reaction mixture.

In certain embodiments, the reaction mixture is essentially free of monomers having acid or anhydride functional groups. By "essentially free" of a material is meant that a composition has only trace or incidental amounts of a given material, and that the material is not present in an amount sufficient to affect any properties of the composition; typically less than 0.2 percent by weight, such as less than 0.1 percent by weight, or less than 0.05 percent by weight, based on the total weight of monomers in the reaction mixture.

The acrylic polymer (c) may be prepared using known addition polymerization techniques, such as organic solution polymerization techniques, in particular from the aforementioned reaction mixtures. Exemplary methods are illustrated in the examples below.

Typical amounts of acrylic polymer component (c) in the curable film-forming composition range from 0.5 to 10 percent by weight, such as 2 to 10 percent by weight, often 2 to 7 percent by weight, based on the total weight of resin solids in the curable film-forming composition.

The curable film-forming compositions of the present invention may further comprise a filler. Examples of fillers that can be present include finely divided minerals such as barium sulfate, silica, including fumed silica and colloidal silica, alumina, colloidal alumina, titanium dioxide, zirconia, colloidal zirconia, clay, mica, dolomite, talc, magnesium carbonate, calcium carbonate, calcium sulfate, calcium silicate, and/or calcium metasilicate. It is believed that the fillers, in combination with the resins in the composition, allow for useful rheological properties such as high viscosity at low shear. Fillers such as colloidal silica may also serve to enhance mar and scratch resistance.

The film-forming composition can additionally include a variety of optional ingredients and/or additives that are somewhat dependent on the particular application of the curable composition, such as other curing catalysts, pigments or other colorants, reinforcements, thixotropes, accelerators, surfactants, plasticizers, extenders, stabilizers, corrosion inhibitors, diluents, hindered amine light stabilizers, UV light absorbers, adhesion promoters, solvents such as alcohols and/or esters, and antioxidants. The curable film-forming composition may be a color coat or clear coat; it may be opaque, translucent, tinted transparent, or colorless transparent.

The curable compositions used in the present invention can be prepared as a one-package or two-package composition. It is most often prepared as a one-package system.

The composition of the present invention is also suitable for formulating high solids compositions. Because the present composition is highly stable, it can be formulated as a high solids composition without the danger of premature gelation. More particularly, the present composition can have a resin solids content of greater than about 40 percent, often greater than about 50 percent and even greater than 55 percent. The resin solids content can be determined by heating 0.3-0.4 grams of the resinous ingredients in the composition in an aluminum weighing dish at 230° F. for 60 minutes.

The present invention is further drawn to a coated substrate, comprising: A) a substrate having at least one coatable surface, and B) the curable film-forming composition described above, applied to at least one surface of the substrate.

Suitable substrates include rigid metal substrates such as ferrous metals, aluminum, aluminum alloys, copper, and other metal and alloy substrates. The ferrous metal substrates used in the practice of the present invention may include iron, steel, and alloys thereof. Non-limiting examples of useful steel materials include cold rolled steel, galvanized (zinc coated) steel, electrogalvanized steel, stainless steel, pickled steel, zinc-iron alloy such as GALVANNEAL, and combinations thereof. Combinations or composites of ferrous and non-ferrous metals can also be used. In certain embodiments of the present invention, the substrate comprises a composite material such as a plastic or a fiberglass composite.

Before depositing any coating compositions upon the surface of the substrate, it is common practice, though not necessary, to remove foreign matter from the surface by thoroughly cleaning and degreasing the surface. Such cleaning typically takes place after forming the substrate (stamping, welding, etc.) into an end-use shape. The surface of the substrate can be cleaned by physical or chemical means, such as mechanically abrading the surface or cleaning/degreasing with commercially available alkaline or acidic cleaning agents which are well known to those skilled in the art, such as sodium metasilicate and sodium hydroxide. A non-limiting example of a cleaning agent is CHEMKLEEN 163, an alkaline-based cleaner commercially available from PPG Industries, Inc.

Following the cleaning step, the substrate may be rinsed with deionized water, with a solvent, or an aqueous solution of rinsing agents in order to remove any residue. The substrate can be air dried, for example, by using an air knife, by flashing off the water by brief exposure of the substrate to a high temperature or by passing the substrate between squeegee rolls.

The substrate may be a bare, cleaned surface; it may be oily, pretreated with one or more pretreatment compositions, and/or prepainted with one or more coating compositions, primers, topcoats, etc., applied by any method including, but not limited to, electrodeposition, spraying, dip coating, roll coating, curtain coating, and the like.

The compositions may be applied to the substrate by one or more of a number of methods including spraying, dipping/immersion, brushing, or flow coating, but they are most often applied by spraying. The usual spray techniques and equipment for air spraying and electrostatic spraying and either manual or automatic methods can be used. The coating layer typically has a dry film thickness of 1-25 mils (25.4-635 microns), often 5-25 mils (127-635 microns).

The film-forming compositions can be applied directly to the surface of a substrate or onto a primer coat or other coating as noted above, such as an electrocoat or topcoat, on the substrate to form a coated substrate in accordance with the present invention. Suitable electrocoat compositions include ED 6465; primers include HP78224EH, both commercially available from PPG Industries, Inc. Alternatively, a primer may not be used and the film-forming compositions can be applied directly to a pigmented basecoat or other coating. Multiple coating layers such as an electrocoat and a primer and optionally a colored base coat may be applied to the substrate prior to application of the curable film-forming composition of the present invention.

After forming a film of the coating on the substrate, the composition can be cured at a temperature in the range of from about 250° F. (121.1° C.) to 400° F. (204.4° C.), and more often in the range of from 260° F. (126.7° C.) to 325° F. (162.8° C.) It should be noted that at higher curing temperatures, typically above about 260° F., other parameters of the present invention can be adjusted because of improved crosslinking from the higher curing temperature. For example, lower functionality epoxy-based resins and/or polyacid curing agents may be used. Typically, the dry film thickness of the cured coating is usually from about 0.5 to about 5 mils and more preferably from about 1.2 to about 3 mils.

After application of the curable film-forming composition to the substrate and upon curing, the coated substrate demonstrates a water contact angle greater than 92°, and a total surface energy less than 29 mN/m. The coated substrate additionally demonstrates adhesive release of asphalt from the surface. "Adhesive release" is a release of the asphalt without removal of any of the coating composition from the substrate, as opposed to "cohesive release", wherein either at least a portion of the coating composition is removed with the asphalt, thereby damaging the coated substrate, or a portion of the asphalt remains attached to the coated substrate after cleaning. After application of the curable film-forming composition to the substrate and upon curing, the coated substrate demonstrates adhesive release with a maximum average pulling force of 20 N when subjected to ASPHALT ADHESION TEST described below. Such properties render the curable film-forming compositions of the present invention particularly suitable for use in methods of mitigating dirt build-up on a substrate, in accordance with the present invention.

In the method of the present invention, dirt build-up on a substrate is mitigated by applying to at least a portion of the substrate the curable film-forming composition described above and then at least partially curing the curable film-forming composition. A curable film-forming composition is applied to at least one surface of the substrate. A substrate may have one continuous surface, or two or more surfaces such as two opposing surfaces. Typically the surface that is coated is any that is expected to be exposed to conditions conducive to dirt build-up, such as consumer and industrial vehicles and building structures. By "dirt" is meant soil, grease, oil, minerals, detergent, salt, tar, asphalt, animal droppings, tree sap, and the like; contaminants that are commonly found outside or in industrial settings, and that tend to adhere to vehicle surfaces.

Each of the embodiments and characteristics described above, and combinations thereof, may be said to be encompassed by the present invention. For example, the present invention is thus drawn to the following nonlimiting aspects. As used herein, the terms "aspect" and "embodiment" are used interchangeably.

In a first embodiment, a curable film-forming composition is provided by the present invention, comprising:
(a) a film-forming polymer comprising reactive epoxy functional groups;
(b) a curing agent comprising add functional groups reactive with the reactive functional groups in (a); and
(c) an acrylic polymer component comprising:
(i) epoxy functional groups; and
(ii) polydialkylsiloxane functional groups;
wherein the components (a), (b) and (c) are different from one another.

In a second embodiment, the acrylic polymer component (c) comprises an acrylic polymer prepared from a reaction mixture comprising:
(i) an ethylenically unsaturated monomer comprising epoxy functional groups; and
(ii) an ethylenically unsaturated monomer comprising polydialkylsiloxane functional groups.

In a third embodiment of the present invention, the ethylenically unsaturated monomer (i) comprising epoxy functional groups in the second embodiment described above may comprise glycidyl acrylate, glycidyl methacrylate, allyl glycidyl ether, and/or methallyl glycidyl ether.

In a fourth embodiment of the present invention, the ethylenically unsaturated monomer (ii) comprising polydialkylsiloxane functional groups in the second or third embodiment described above may have a weight average molecular weight of 1000 to 30000.

In a fifth embodiment of the present invention, in any of the embodiments described above, the film-forming polymer (a) may comprise an acrylic polymer.

In a sixth embodiment of the present invention, in any of the first, second, third, fourth or fifth embodiments described above, the curing agent (b) may comprise an addition polymer, a polyether polymer, a polyester polymer, a polyester acrylate polymer, a polyurethane polymer, and/or a polyurethane acrylate polymer.

A coated substrate is also provided by the present invention, comprising:
A) a substrate having at least one coatable surface, and
B) a curable film-forming composition applied to at least one surface of the substrate, wherein the film-forming composition is prepared from the curable film-forming composition according to any of the first through sixth embodiments above.

A method of mitigating dirt build-up on a substrate is provided by the present invention, comprising (1) applying to at least a portion of the substrate a curable film-forming composition according to any one of the first through sixth embodiments above, and (2) at least partially curing the curable film-forming composition.

The following examples are intended to illustrate various embodiments of the invention, and should not be construed as limiting the invention in any way.

EXAMPLES

To evaluate the effectiveness of coating formulation changes on dirt adhesion, an ASPHALT ADHESION TEST was developed. Generally, the procedure is as follows: A 4"×12" test panel is coated on both sides with the desired coating(s). After the appropriate cure time, one-quarter inch diameter plastic compression sleeves are placed on the test panel surface and filled with about 0.15 grams of Asphalt Thin Crack Filler, available from CP Industries of Salt Lake City, Utah. The asphalt in the compression sleeves is dried in a 150° F. oven for one hour. A minimum of 16 hours drying time at room temperature is allowed before attempting to remove the asphalt-filled sleeves from the test panel surface. The asphalt-filled sleeves are pulled off the clear surface by using an INSTRON MINI 44 machine and the associated software, made by Instron Corporation of Norwood, Mass. to obtain a quantitative value. A ring device attached to the arm of the Instron machine pulls the asphalt sleeve from the surface of the panel at an 80 mm/minute pulling rate. Typically, the asphalt-filled sleeve adhesively releases from the coated substrates of the present invention between 0 to 20 N. Higher values are typically seen for cohesive failure within the asphalt on other coated substrates.

Example A

An epoxy functional silane containing acrylic was prepared as follows. 220 g of Solvesso 100 was charged into a 4 L stainless steel pressure reactor fitted with a thermocouple, stirrer and a pressure gauge. A vacuum of −30 PSI is applied then the reactor is sealed and heated to 165° C. Charge A (a mix of 226.2 g of Glycidyl Methacrylate, 176.4 g of Butyl Methacrylate, 45.4 g of Silmer Mo8, and 7.0 g of α-methyl styrene dimer) is added over the course of 2.5 hrs. Meanwhile, Charge B (a mix of 150.0 g of Solvesso 100 and 23.5 g of Di t-butylperoxide) is started at the same time but added over the course of 4 hrs. 30 minutes after Charge A is complete, Charge C (a mix of 40.5 g of Glycidyl Methacrylate, 1.1 g of Methyl Methacrylate, 37.3 g of Styrene and 2.1 g of α-methyl styrene dimer) is added over the course of 30 minutes. Once Charge B is complete, Charge D (a mix of 58.6 g Dowanol PM Acetate and 5.3 g of Di t-butylperoxide) is added over 30 minutes followed by a 2 hour hold at 165° C. During the course of the reaction, the temperature is held constant at 165° C. while the pressure is allowed to increase from −30 PSI to ~6 PSI. The resulting polymer solution contained 56.8% solids and an epoxy equivalent weight of 520 g/mol.

Clear Film forming compositions were prepared from the following ingredients:

TABLE 1

| Name | Manufacturer | Comparative Example 1 | Example 2 | Example 3 | Example 4 |
|---|---|---|---|---|---|
| N-PROPANOL | Dow Chemical | 1.07 | 1.07 | 1.07 | 1.07 |
| N-AMYLALCOHOL | Dow Chemical | 0.22 | 0.22 | 0.22 | 0.22 |
| Ethyl 3-Ethoxy Proprionate | Dow Chemical | 12.14 | 12.14 | 12.14 | 12.14 |
| DIBASICESTER | Cytec Industries | 1.05 | 1.05 | 1.05 | 1.05 |
| TINUVIN 171 | BASF corp. | 0.96 | 0.96 | 0.96 | 0.96 |
| TINIUVIN 900 | BASF corp. | 0.32 | 0.32 | 0.32 | 0.32 |
| TINUVIN123 | BASF corp. | 0.53 | 0.53 | 0.53 | 0.53 |
| TINUVIN928 | BASF corp. | 0.27 | 0.27 | 0.27 | 0.27 |
| Epoxy Functional Acrylic[1] | PPG Industries, Inc. | 42.9 | 41.97 | 40.59 | 38.29 |
| Epoxy Silane Acrylic as described in Example A | PPG Industries, Inc. | 0.0 | 1.03 | 2.56 | 5.10 |
| Acid Functional Polyester[2] | PPG Industries, Inc. | 26.87 | 26.87 | 26.87 | 26.87 |
| Half-Ester of a vinyl copolymer[3] | PPG Industries, Inc. | 5.78 | 5.78 | 5.78 | 5.78 |
| Silica Dispersion 1[4] | PPG Industries, Inc. | 2.65 | 2.65 | 2.65 | 2.65 |
| Silica Dispersion 2[5] | PPG Industries, Inc. | 4.23 | 4.23 | 4.23 | 4.23 |
| 50% DYNOADDF1 | Dyneon | 0.11 | 0.11 | 0.11 | 0.11 |
| DISPARLON OX-60 | Kusumoto Chemicals | 0.2 | 0.2 | 0.2 | 0.2 |
| ARMEEN M2C | Akzo Chemcials | 0.7 | 0.7 | 0.7 | 0.7 |

[1]Epoxy Functional Acrylic consists of 50.8% Glycidyl Methacrylate, 41.8% Butyl Methacrylate, 7.2% Styrene, and 0.2% Methyl Metharcylate at 64.5% solids in a mixture of 71.6% Solvesso 100 and 28.4% Dowanol Pm Acetate, with an Eppoxy Equivilent weight of 450 g/mol
[2]Acid Functional Polyester- As described in U.S. Pat. No. 5,196,485 Example F
[3]Half-Ester of a vinyl copolymer- derived from the ethanolic ring opening of a copolymer of 54.5% 1-Octene and 45.5% Maleic Anhydride at 67% solids in Butyl Acetate with an effective solid acid equivalent weight of 341.5 g/mol.
[4]Silica Dispersion1- A dispersion of 8% Aerosil R812 silica mixed with 42% Amyl Alcholol and 50% of a half-ester resin as disclosed in U.S. Pat. No. 5,196,485 Example G
[5]Silica Dispersion 2- A dispersion of 9% Cab-o-Sil CT-1206 silica mixed with 51.6% Amyl Alcohol and 39.4% of a half ester as disclosed in U.S. Pat. No. 5,196,485 Example G Clear coat comparative example 1 and clear examples 2 through 4 were spray applied onto 4 inch by 12 inch cold rolled steel panels that were pre-coated with cured ED 6465 Electrocoat. The substrate panels are available from ACT Test Panels LLC of Hillsdale, Mich. Two coats of Black Sapphire (BIP2MA475) water based basecoat, available from PPG Industries, were applied to the ACT substrate panels using a SPRAYMATION machine before the clears were applied. The basecoat was allowed to flash for five minutes at room temperature and for seven minutes at 158° F. before two coats of clear coat were applied. The cured film thickness of the black Basecoat was about 0.5 mils. The clears were flashed for ten minutes at room temperature (72° F.) before baking for thirty minutes at 285° F.

Water and Methylene Iodide contact angles were measured using a KRUSS DSA 100 instrument made by KRUSS GmbH of Hamburg, Germany and the associated software. The surface energy numbers are based upon Owens-Wendt calculations. Clear coat examples 2, 3 and 4 have higher contact angles and lower surface energies as shown in the table below.

TABLE 2

|  | Total Surface energy (mN/m) | Dispersive Component (mN/m) | Polar Component (mN/m) | Water Contact Angle (°) | Methylene Iodide Contact Angle (°) | Polar Component (%) |
|---|---|---|---|---|---|---|
| Comparative Example 1 | 43.55 | 43.06 | 0.49 | 91.20 | 31.90 | 1.13 |
| Example 2 | 30.54 | 29.54 | 1.00 | 96.10 | 56.60 | 3.27 |
| Example 3 | 31.58 | 31.09 | 0.49 | 98.50 | 54.80 | 1.55 |
| Example 4 | 28.88 | 28.17 | 0.71 | 98.80 | 59.50 | 2.46 |

The asphalt release property is shown in Table 3. The ability to release asphalt from the clear surface is a measure of ease of cleaning.

Table 3 shows that the clear coating examples 2, 3 and 4 are easier to clean as measured by the adhesive release of asphalt from the clear surface. The ASPHALT ADHESION TEST was done using the clears over the black basecoat.

TABLE 3

| CLEAR COAT | Asphalt Release Test |
|---|---|
| Comparative Example 1 | Cohesive |
| Example 2 | Adhesive |
| Example 3 | Adhesive |
| Example 4 | Adhesive |

Whereas particular embodiments of this invention have been described above for purposes of illustration, it will be evident to those skilled in the art that numerous variations of the details of the present invention may be made without departing from the scope of the invention as defined in the appended claims.

Therefore, we claim:

1. A curable film-forming composition comprising:
   (a) a film-forming polymer comprising reactive epoxy functional groups;
   (b) a curing agent comprising acid functional groups reactive with the reactive functional groups in (a); and
   (c) an acrylic polymer component comprising:
      (i) epoxy functional groups; and
      (ii) polydialkylsiloxane functional groups;
   wherein the components (a), (b) and (c) are different from one another.

2. The composition of claim 1, wherein the acrylic polymer component (c) comprises an acrylic polymer prepared from a reaction mixture comprising:
   (i) an ethylenically unsaturated monomer comprising epoxy functional groups; and
   (ii) an ethylenically unsaturated monomer comprising polydialkylsiloxane functional groups.

3. The composition of claim 1, wherein the film-forming polymer (a) comprises an acrylic polymer.

4. The composition of claim 1, wherein the curing agent (b) comprises an addition polymer, a polyether polymer, a polyester polymer, a polyester acrylate polymer, a polyurethane polymer, and/or a polyurethane acrylate polymer.

5. The composition of claim 2, wherein the ethylenically unsaturated monomer (i) comprising epoxy functional groups comprises glycidyl acrylate, glycidyl methacrylate, allyl glycidyl ether, and/or methallyl glycidyl ether.

6. The composition of claim 2, wherein the ethylenically unsaturated monomer (ii) comprising polydialkylsiloxane functional groups has a weight average molecular weight of 1000 to 30000.

7. The composition of claim 1, wherein the acrylic polymer (c) is present in the curable film-forming composition in an amount ranging from 0.5 to 10 percent by weight, based on the total weight of resin solids in the curable film-forming composition.

8. A coated substrate comprising:
   A) a substrate having at least one coatable surface, and
   B) a curable film-forming composition applied to at least one surface of the substrate, wherein the-film-forming composition is prepared from the curable film-forming composition of claim 1.

9. A method of mitigating dirt build-up on a substrate, comprising:
   (1) applying to at least a portion of the substrate a curable film-forming composition comprising:
      (a) a film-forming polymer comprising reactive epoxy functional groups;
      (b) a curing agent comprising acid functional groups reactive with the reactive functional groups in (a); and
      (c) an acrylic polymer component comprising:
         (i) epoxy functional groups; and
         (ii) polydialkylsiloxane functional groups;
      wherein the components (a), (b) and (c) are different from one another; and
   (2) at least partially curing the curable film-forming composition.

10. The method of claim 9, wherein the film-forming polymer (a) comprises an acrylic polymer.

11. The method of claim 9, wherein the curing agent (b) comprises an addition polymer, a polyether polymer, a polyester polymer, a polyester acrylate polymer, a polyurethane polymer, and/or a polyurethane acrylate polymer.

12. The method of claim 9, wherein the acrylic polymer component (c) comprises an acrylic polymer prepared from a reaction mixture comprising:
   (i) an ethylenically unsaturated monomer comprising epoxy functional groups; and
   (ii) an ethylenically unsaturated monomer comprising polydialkylsiloxane functional groups.

13. The method of claim 12, wherein the ethylenically unsaturated monomer (i) comprising epoxy functional groups comprises glycidyl acrylate, glycidyl methacrylate, allyl glycidyl ether, and/or methallyl glycidyl ether.

14. The method of claim 12, wherein the ethylenically unsaturated monomer (ii) comprising polydialkylsiloxane functional groups has a weight average molecular weight of 1000 to 30000.

15. The method of claim 9, wherein the acrylic polymer component (c) is present in the curable film-forming composition in an amount ranging from 0.5 to 10 percent by weight, based on the total weight of resin solids in the curable film-forming composition.

* * * * *